United States Patent
Takeuchi

(10) Patent No.: US 7,036,031 B2
(45) Date of Patent: Apr. 25, 2006

(54) ELECTRONIC DEVICE AND ITS POWER CONTROL METHOD

(75) Inventor: Junichi Takeuchi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 615 days.

(21) Appl. No.: 09/970,529

(22) Filed: Oct. 4, 2001

(65) Prior Publication Data

US 2002/0046355 A1 Apr. 18, 2002

(30) Foreign Application Priority Data

Oct. 5, 2000 (JP) .............................. 2000-306704

(51) Int. Cl.
*G06F 1/26* (2006.01)
*G06F 1/32* (2006.01)
*H04B 1/38* (2006.01)
*H04B 1/40* (2006.01)

(52) U.S. Cl. ...................... 713/323; 713/300; 713/320; 713/322; 713/324; 455/73; 455/88

(58) Field of Classification Search ................ 713/300, 713/310, 320, 322, 323, 324; 455/127.1
See application file for complete search history.

(56) References Cited

U.S. PATENT DOCUMENTS

| 5,881,102 A | * | 3/1999 | Samson ....................... 713/322 |
| 5,974,551 A | * | 10/1999 | Lee ............................. 713/300 |
| 6,230,277 B1 | * | 5/2001 | Nakaoka et al. ............ 713/320 |
| 6,363,491 B1 | * | 3/2002 | Endo .......................... 713/310 |
| 6,640,268 B1 | * | 10/2003 | Kumar ......................... 710/46 |
| 6,771,935 B1 | * | 8/2004 | Leggett ...................... 455/66.1 |

FOREIGN PATENT DOCUMENTS

| JP | 10-70561 | 3/1998 |
| JP | 11-340955 | 12/1999 |
| JP | 2000-284867 | 10/2000 |
| JP | 2001-7791 | 1/2001 |
| JP | 2001-292195 | 10/2001 |

OTHER PUBLICATIONS

Japanese Official Action dated Dec. 24, 2003.

* cited by examiner

Primary Examiner—Lynne H. Browne
Assistant Examiner—James K. Trujillo
(74) Attorney, Agent, or Firm—Scully, Scott, Murphy & Presser, P.C.

(57) ABSTRACT

To provide an interface device and method of controlling power to achieve reduction in power consumption by presetting the transceiver in the standby state. When the physical layer (PHY) 10 makes a transition to a low power consumption mode, a standby signal (standby) for instructing the optical transceiver 30 to preset it into the low power consumption mode is brought into active and is output thereto. When the optical transceiver receives said standby signal, it is brought into the standby mode which is the low power consumption mode.

22 Claims, 14 Drawing Sheets

ELECTRONIC DEVICE AND ITS POWER CONTROL METHOD

FIELD OF THE INVENTION

The present invention relates to a device which communicates with other device which is connected therewith, and in particular to a device and method which is preferable for reduction in power consumption of the devices which are connected to each other via a serial bus and the like which complies with IEEE 1394 standard.

BACKGROUND OF THE INVENTION

Firstly, the configuration of a device including an interface which is to be connected over a serial bus of IEEE 1394 (IEEE std. 1394–1995 IEEE standard for a High Performance Serial Bus) will be briefly described. FIG. 10 is a schematic view showing the configuration of an electronic device (termed as IEEE 1394 device) which is connected via a serial bus of IEEE 1394 standard (complying with P1394a). Devices which can be connected via the IEEE 1394 serial bus, such as computers installed in a consumer's electric appliance, an automobile, a measuring instrument, an electronic music instrument, a personal computer and etc., may constitute the IEEE 1394 device.

Referring now to FIG. 10, the IEEE 1394 device 1 comprises, as an interface device (IEEE 1394 controller) for performing communication with other nodes over an IEEE 1394 serial bus 11, a physical layer 10 referred to as "PHY"), a link layer 21 and a higher level CPU 22, etc. The physical layer (PHY) 10 usually comprises an LSI (large scale integrated circuit) and has various functions such as bus initialization, bus arbitration, data re-synchronization, coding/decoding of transmit and receive data, connection state management and port control. The CPU 22 is adapted to perform control of the application layers. The IEEE 1394 serial bus 11 is connected electrically by a point to point basis and a connection topology of a plurality of the IEEE 1394 serial buses is based on star type topology. The IEEE 1394 serial bus 11 comprises a 6-core cables including two-pairs of shielded twisted pair cables and one pair of power supply cable (two pairs of twisted cables comprising 4 cores may be used) as a standard bus cable. One of the two pairs of twisted pair cable is used for data transmission, while the other pair is used for transmission of strobe signal.

As for a publication with regards to the reduction in power consumption of an electronic device which is connected via IEEE 1394 serial bus, there exists, for example, JP-A No. 10-70561, which proposes a method of eliminating a problem that when a power supply is turned on at each node, an electric power is supplied to all blocks such as a physical layer, link layer and higher level CPU, so that the electric current is consumed wastefully in these blocks even if the node is not connected to other nodes. This method comprises the steps of causing the link controller not to operate when the node is not connected to other node via IEEE 1394 serial bus and causing the controller to operate when the node is connected thereto so that the power consumption in a communication interface is reduced.

Referring to FIG. 10, as a low power consumption feature, a circuit including a Suspended/Resume function for the physical layer 10, link layer 21 and the higher level CPU is partially standardized as a specification (P1394a. Draft 3.0, which are an additional standard of IEEE Std. 1394 to 1995). In this additional standard, states such as "Disabled", "Dis-connected" and "Suspended" are defined in order to reduce the power consumption of the physical layer.

FIG. 11 is a diagram showing the configuration of a high speed serial bus and an IEEE 1394 long-distance device for performing long distance transmission (also referred to as "Giga bits 1394" which is prescribed in the additional standard P1394b). Referring now to FIG. 11, the physical layer (PHY) 10 of one node outputs a signal to an optical fiber via an optical transceiver 30 which is connected to an optical port and transmits a signal to an optical transceiver (not shown) of the physical layer of the other node and receives via the optical transceiver 30 a signal which is output to the optical fiber 12 from the optical transceiver (not shown) of the physical layer of the other node. Some of IEEE 1394 long distance devices for performing long distance transmission use unshielded twisted pair, the specification of which is specified by the IEEE 1394 standard P1394b (category 5 UTP physical medium dependent layer; CAT-5 UTP: category 5 Unshielded Twisted Pair).

FIG. 12 is a diagram showing the configuration of the physical layer 10 of the IEEE 1394 long distance device shown in FIG. 11. Referring to FIG. 12, the physical layer 10 of the IEEE 1394 long distance device comprises a main logic 100, a plurality of transmission/reception ports 110 (N transmission/reception ports in FIG. 12) and a link interface 120. The main logic 100 comprises a tone generating unit 10 for generating a tone signal (TONE), a connection management state machine 102 for managing the connection state for each of the transmission/reception ports, a transmission/reception circuit 103 for encoding and decoding of transmission/reception data and an arbitration state machine 104 for managing the arbitration of buses. The transmission/reception ports 110-1 of the plurality of transmission/reception port 110-1 to 110-8 is connected to the optical transceiver 30.

The optical transceiver 30 performs conversion from an electrical signal to an optical signal of the transmission signal, conversion of a received optical signal to an electrical signal and reporting of optical detection, etc. As schematically shown in FIG. 13, the optical transceiver 30 comprises a transmit circuit 31 which receives data from the transmission port, an E/O (electrical-to-optical) conversion circuit 36 comprising a semiconductor laser for converting electrical signal into optical signal, an O/E (optical-to-electrical) conversion circuit 37 comprising a photodiode for converting an optical signal which is received via the optical fiber (12 in FIG. 11) to electric signal and a reception signal which receives an electric signal from the O/E conversion circuit 37 to output to the transmission/reception port. The receiver circuit 32 comprises a current-voltage conversion circuit which receives a detection current of the O/E conversion circuit 37 and converts it into a voltage and a buffer circuit which receives an output from the current-voltage conversion circuit and outputs a voltage. The receiver circuit 32 comprises a signal detecting circuit (not shown) which outputs a signal detection signal (SD) (Signal Detection) to the physical layer 10 on detection of the signal. If the data is transmitted on parallel-bits basis by using the reception port and the optical transceiver 30, the optical transceiver 30 includes a parallel to serial conversion circuit and a serial to parallel conversion circuit.

FIG. 14 is diagram for explaining the state transition in the physical layer 10 of the IEEE 1394 long distance device. A data signal line, which transmits and receives data, is provided between the transmission/reception ports of the physical layer 10 (corresponding to 110 in FIG. 12). Further a signal detection signal (SD) line for notifying the physical layer 10 when the signal is detected by the signal detecting circuit of the optical transceiver 30 and a plug signal (PLUG) line which notifies the connection state between the connector (not shown) of the optical transceiver 30 and the cable connector are connected therebetween. In other words, when the plug (or receptacle) of the connector (not shown) of the optical transceiver 30 is connected to the cable connector, the plug signal (PLUG) is rendered active ("1").

When the physical layer is in the disconnected state and a cable is connected to the connector of the optical transceiver 30, the plug signal (PLUG) is rendered active "1" and the physical layer 10 performs an initialization operation (speed arbitration operation) by tone signal transmission. If there is no destination node, the plug signal remains "disconnected" and a connection monitoring tone signal (TONE) is transmitted (refer to FIG. 6). If there is a destination node to be connected, the state transition to a Resuming state is executed for the physical layer to perform operations such as transmission of a continuous signal. If a handshake with a destination node is normally conducted, the state transition to the active state is executed.

When the physical layer is in an active state and receives an instruction of suspending the transmission/reception port from a higher level device which controls the physical layer (Suspended Initiator), or when the destination note is brought into a suspended state (Suspended target), the transmission/reception port in interest is brought into a "Suspended" state.

When the physical layer 10 is in a suspended state and receives a resuming instruction from the higher level device or the optical transceiver of its own node receives the signal detection from another node (at this time, the signal detection signal (SD) of the optical transceiver is rendered active), the transmission/reception port of the physical layer in interest is returned to a Resuming process. When the suspend instruction issued from the higher level device is received by the physical layer 10 in the resuming process, the physical layer 10 is brought into a suspended state.

SUMMARY OF THE DISCLOSURE

When the physical layer is in the disconnected and suspended state in the above-mentioned conventional IEEE 1394 long distance device, the physical layer is switched into the low power consumption mode. However, the optical transceiver 30 remains in the active state in which normal operation is conducted.

Even when some port is in the disconnected or standby state in the connection management state machine of the physical layer 10 in this case, the optical transceiver 30 corresponding to said port is in the active state, resulting in that a wasteful current will be consumed.

With an electronic device including the optical transceiver is required the reduction of power consumption as a power policy.

Accordingly, it is an object of the present invention to provide an electronic device and its power control method which reduces power consumption in the electronic system in which a plurality of electronic devices are connected to each other via buses for communication.

In order to accomplish the above-mentioned object, in accordance with one aspect of the present invention, is provided an electronic device including a transceiver and a physical layer which transmits and receives data and control signals to and from said transceiver, in which said transceiver is brought from normal operation mode into low power consumption mode when said physical layer is in the low poaer consumption mode.

In the electronic device in accordance with one aspect of the present invention, the physical layer comprises means for outputting to said transceiver a standby signal which is a control signal to instruct said transceiver to change into the low power consumption mode in response to a transition of said physical layer into the low power consumption mode and said transceiver is configured to change from an operating state into a standby state which is the low power consumption mode when said standby signal instructs said transceiver to change into the low power consumption mode. In the electronic device according to the present invention, the physical layer In the electronic device in accordance with one aspect of the present invention, the physical layer is configured to change into said low power consumption mode when a transmission/reception port of said physical layer which is connected to said transceiver is in a suspended state which is an interrupted state, or is in a suspended state and in a disconnected state.

In the electronic device in accordance with one aspect of the present invention, the physical layer comprises: one or more transmission/reception ports; a state machine circuit which controls transition of state for each port, said state being among a disconnected state, a suspended state which is the interrupted state, a resuming state which is a resuming process from said disconnected state or said suspended state to an active state and an active state; and means which makes active a standby signal to output said standby signal, said standby signal being a control signal to instruct said transceiver connected to said transmission port to change into the lower power consumption mode, when a state of said transmission/reception port, state transition of said transmission/reception port being managed by said state machine circuit of said physical layer, is in the disconnected state, or when said transmission/reception port is changed into the suspended state in response to an instruction issued from another electronic device which is connected via said bus to said electronic device or from a higher level device of said electronic device.

In the electronic device in accordance with another aspect of the present invention, the electronic device comprises means for transmitting a low speed tone signal having pulse components, the frequency of which is lower than a predetermined value as a tone signal which is transmitted for monitoring connection between said electronic device and another device which is connected thereto through a bus when said physical layer is in the low power consumption mode In the electronic device in accordance with another aspect of the present invention, the physical layer terminates transmission of tone signal for monitoring bus connection to another electronic device connected to the electronic device via the bus when said physical layer of said electronic device is in the low power consumption mode.

In the electronic device in accordance with another aspect of the present invention, the tone signal is output for a predetermined period of time when the plug signal (PLUG) which is a connector connection signal becomes active and that the transmission of the tone signal is terminated if the tone signal which is a response from the opposing node is not received.

In accordance with another aspect of the present invention, is provided a method for controlling power of an electronic device, wherein said electronic device comprises at least a transceiver and a physical layer for performing the transmission/reception of data to/from said transceiver and said electronic device performing communication with another electronic device via a bus to which said transceiver is connected, said method comprising the steps of: bringing said transceiver into a low power consumption mode in response to a transition of said physical layer to the low power consumption mode.

Still other objects and advantages of the present invention will become readily apparent to those skilled in this art from the following detailed description, wherein only the preferred embodiment of the invention is shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
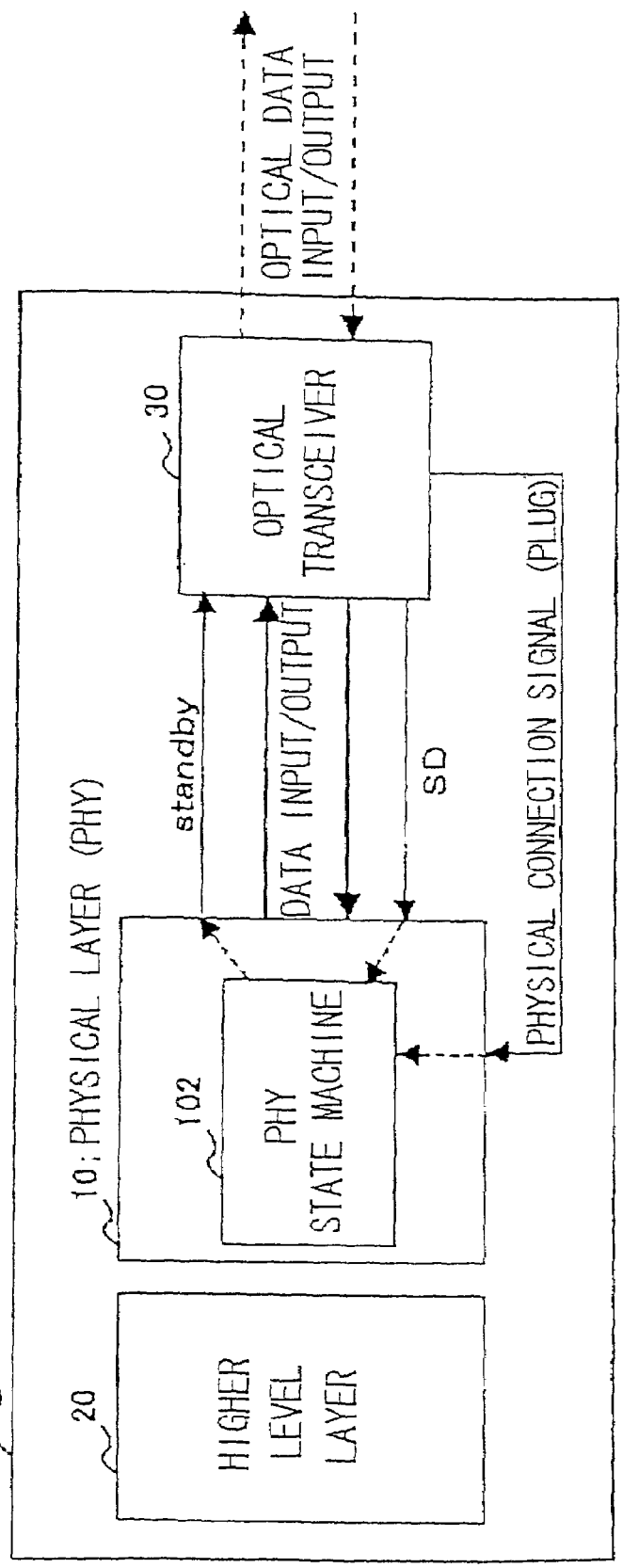
FIG. 1 is a diagram showing the configuration of one embodiment of the present invention.

The preferred embodiment of the present invention will now be described. The device in accordance with the present invention is preferably applied to the above-mentioned IEEE 1394 standard long distance device. In a device in accordance with one embodiment of the present invention, there is provided a standby signal (standby) for instructing the setting of low power mode to an optical transceiver 30 in case of the low power consumption mode of a physical layer (PHY) (10) as a control signal which is transmitted/received between the transmission/reception port of the PHY (10) and the optical transceiver. Bringing both PHY and optical transceiver into low power consumption mode enables reduction in the power consumption of the whole of the device.

In a preferred embodiment of the present invention, when the PHY (10) is changed into the low power consumption mode, the PHY (10) outputs a standby signal in an active state to the transceiver (30) for making the transceiver (30) to change into the low power consumption mode. The transceiver (30), on receipt of the standby signal, is set to the standby mode, which is the lower power consumption mode.

When the transmission/reception port is in the disconnected state or the suspended state, PHY (10) is brought into the low power consumption mode. When the transmission/reception port is in the standby mode, reduction in the power consumption of the optical transceiver is performed by turning off the circuit which is not necessary to operate and by operating with a low power supply voltage as well as various methods which will be described below.

In a preferred embodiment of the present invention, one electronic device transmits a continuous signal forming a resuming signal to another electronic device being connected to the one electronic device in the resuming process of PHY (10) from its low power consumption mode in the one electronic device. When the continuous signal is detected by signal detecting means (circuit) of the transceiver of the another electronic device, the signal detecting circuit notifies the PHY of the another electronic device of the signal detection. In the resuming process of the PHY of the another electronic device which receives the signal detection from the signal detecting circuit, a standby signal which is output to the transceiver is made inactive, and the transceiver which receives the standby signal of an inactive state makes a transition to an active state.

In another preferred embodiment of the present invention, reduction in power consumption may be achieved by transmitting and receiving a tone signal having a pulse frequency lower than a predetermined value as the tone signal which is transmitted and received for monitoring the connection, between one electronic device and another electronic device connected thereto via a bus when PHY (10) of the one electronic device is in the low power consumption mode.

In another preferred embodiment of the invention, reduction in power consumption may be achieved by lowering the frequency of the pulse train of a continuous signal which forms a resuming signal transmitted by one electronic device, less than a standardized value for a predetermined period of time in the resuming process of PHY (10) of the one electronic device from the low power consumption mode.

In another preferred embodiment of the present invention, reduction in power consumption may be achieved by configuring in such a manner that transmission of a tone signal for monitoring connection to another electronic device connected to the one electronic device via the bus is terminated when PHY (10) of the one of the electronic devices is in the low power consumption mode.

In still another preferred embodiment of the present invention, reduction in power consumption may be achieved by configuring in such a manner that a transceiver of an electronic device makes a connector connection signal active and outputs it to the physical layer when a bus cable is removably inserted into a bus connecting connector of the transceiver of the electronic device and a connection monitoring (detecting) tone signal is transmitted to a bus when the bus cable is connected to a bus connecting connector of the transceiver of the one of the electronic devices and the transmission of the connection monitoring signal is terminated if a response signal is not received from the electronic device which is to be connected.

The embodiments of the present invention will be described in more detail with reference to the drawings.

FIG. 1 is a diagram showing the configuration of an electronic device, which constitutes an embodiment of the present invention. Connections and an interface unit of the IEEE 1394 long-distance device are shown therein. In FIG. 1, higher level layer 20 is a higher level layer of the physical layer (PHY) 10 and constitutes a link layer, transaction layer, application layer and the like. The higher level layer 20 comprises a hardware circuit, firmware, CPU (software), and etc. Transmission and reception of packets are mainly conducted from and to this higher level layer 20.

The physical layer (PHY) 10 usually comprises LSIs as mentioned above and performs bus connection management, arbitration for transmission and conversion of transmission signal to standardized electric signal.

Figure 13:
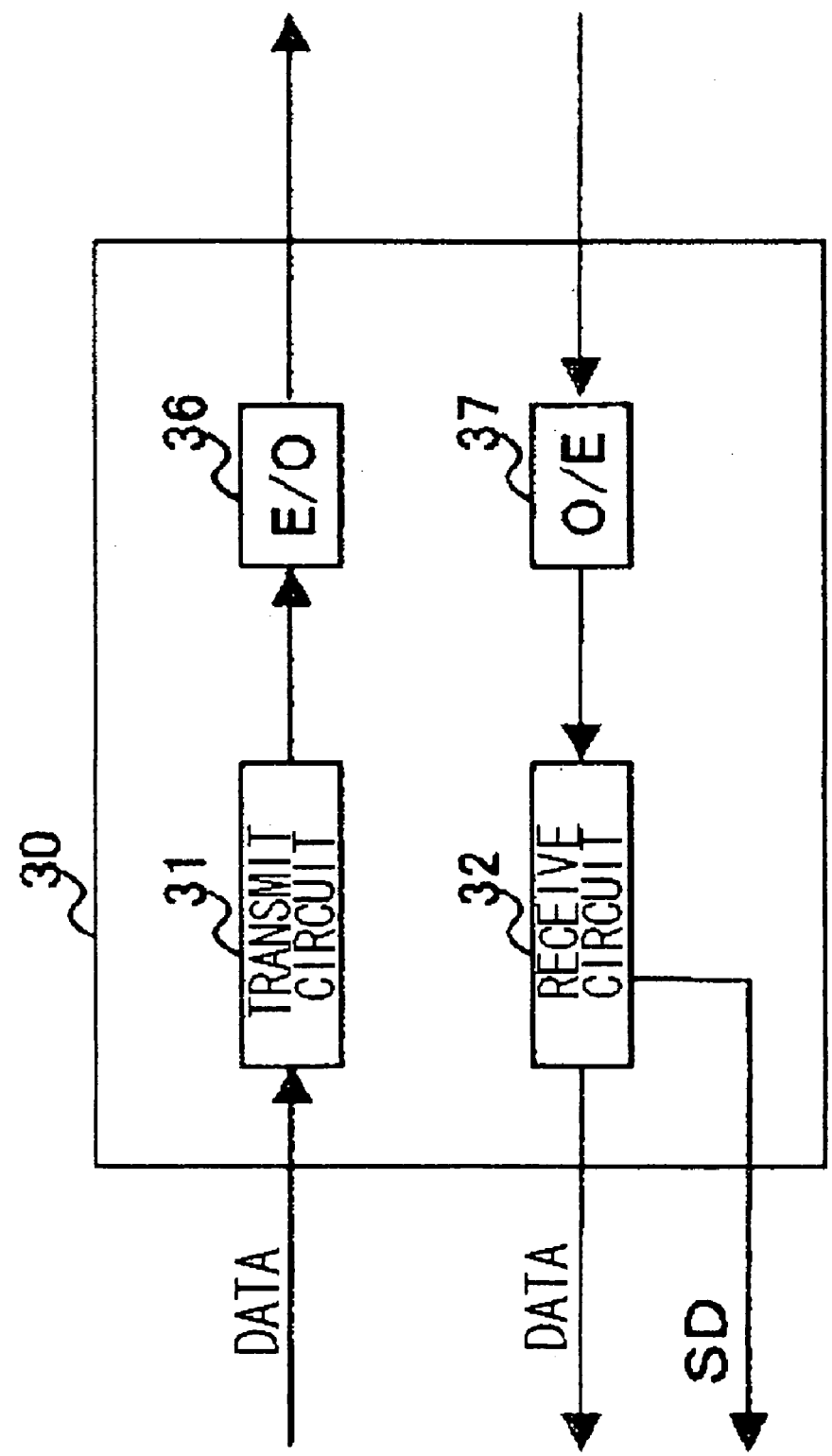
FIG. 13 is a diagram schematically showing an example of the configuration of the optical transceiver of the IEEE 1394 long distance device.
Figure 14:
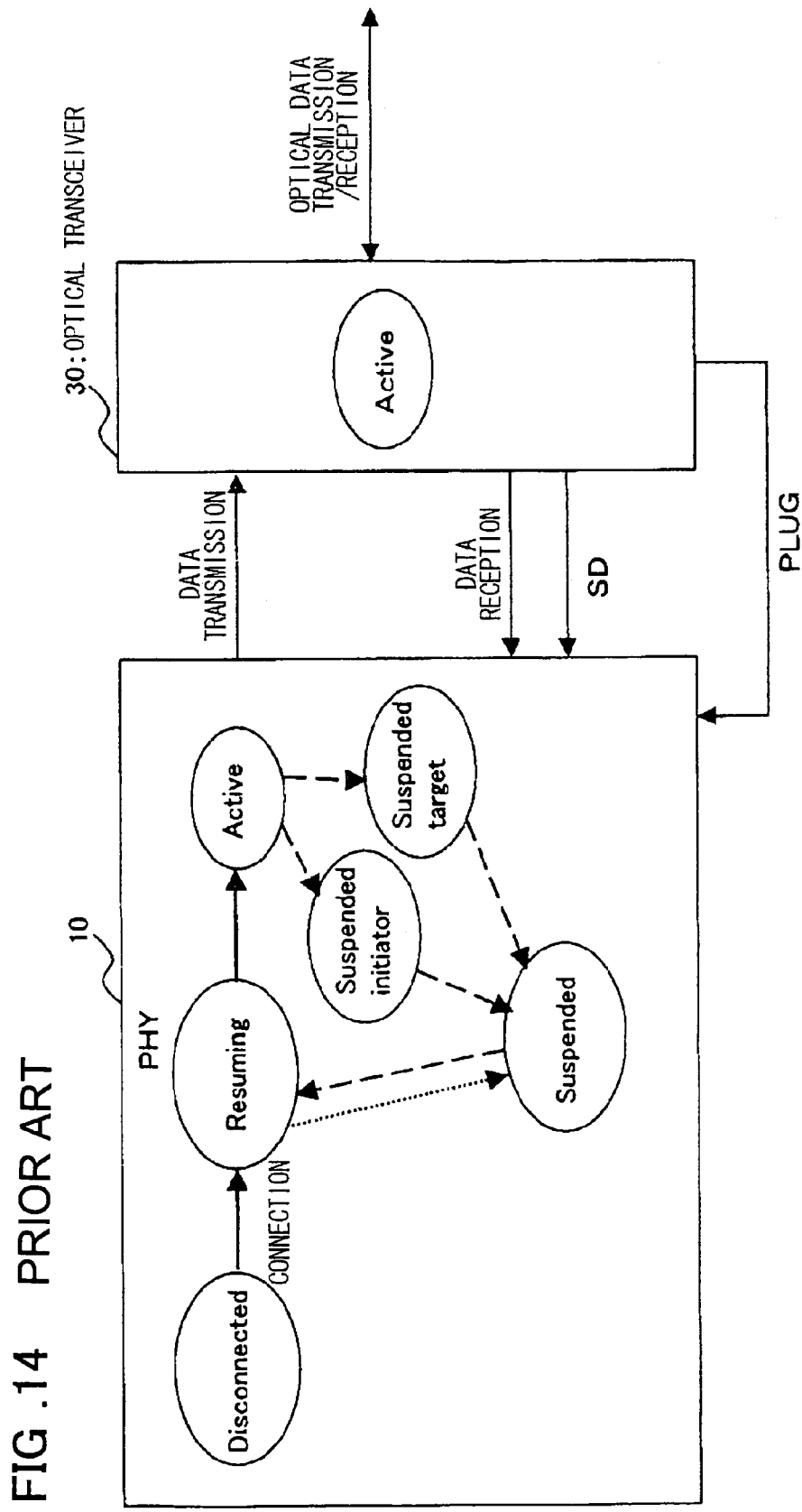
FIG. 14 is a diagram schematically explaining the state transition of the physical layer (PHY) of the IEEE 1394 long distance device.

The optical transceiver 30 performs conversion of electrical transmission signal into optical signal, conversion of optical receive signal into electric signal and notification of optical signal detection. As mentioned with reference to FIG. 13, the optical transceiver 30 comprises an E/O (electrical-to-optical) conversion circuit 36 including a semiconductor laser (LD) for converting the electric signal from the data transmission circuit into optical signal, an O/E (optical-to-electrical) conversion circuit 37 including a photodiode (PD), etc. for converting the optical signal received from the optical fiber into electric signal and a reception circuit 32 for receiving the electric signal from the O/E conversion circuit 37. The reception circuit 32 comprises a signal detecting circuit (not shown) for outputting a signal detect signal SD (signal detect).

Data signals are exchanged between the physical layer 10 and the optical transceiver 30. The control signal which is transmitted from the physical layer 10 to the optical transceiver includes a standby signal (standby) for controlling the presetting of the optical transceiver 30 into standby state. The control signal, which is transmitted from the optical transceiver 30 to the physical layer 10, includes the above-mentioned signal detection signal (SD) and the physical connector connection signal (PLUG). The physical connector connection signal (PLUG) is preset to "1" (active) when the optical fiber cable connected to the connector (not shown) of the optical transceiver 30.

The physical layer 10 comprises a state machine 102 (corresponding to 102 in FIG. 12), which manages the state transition of each of disconnected state, resuming state, active state and suspended state.

Figure 12:
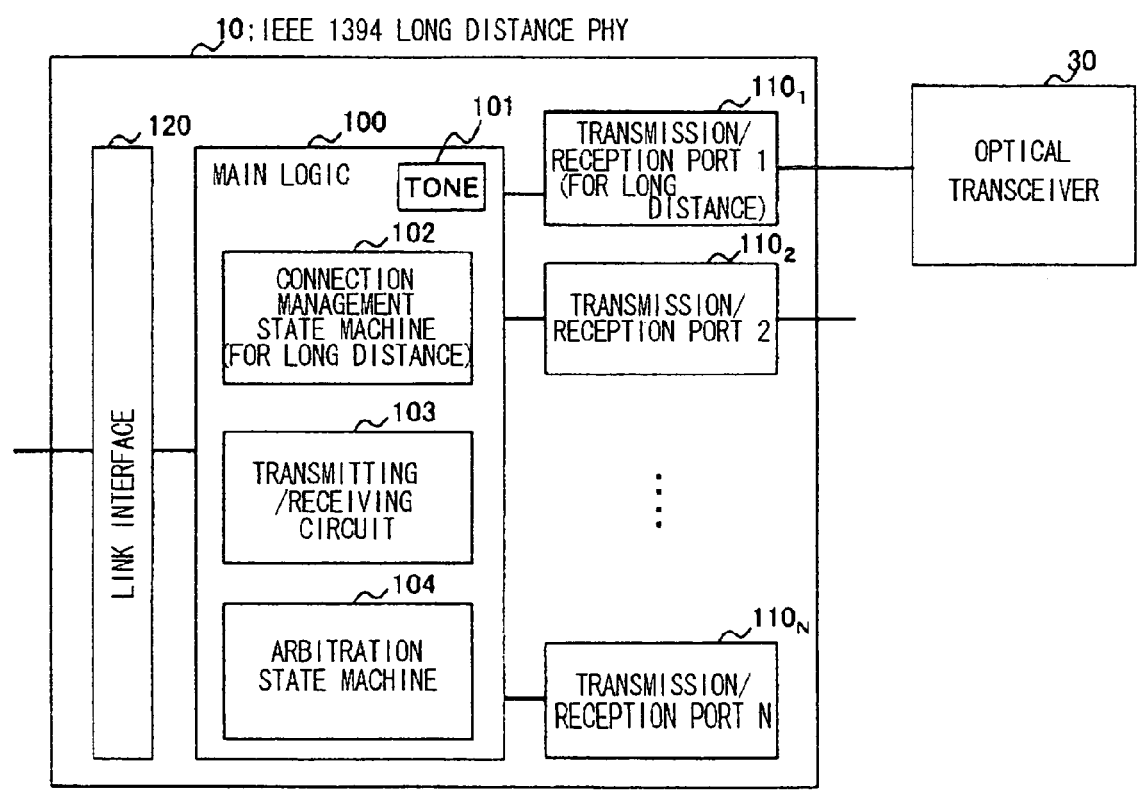
FIG. 12 is a diagram schematically explaining the configuration of the physical layer (PHY) of the IEEE 1394 long distance device.

Although the physical layer 10 in one embodiment of the present invention is identical to the physical layer 10 (IEEE 1394 long distance PHY) shown in FIG. 12 in block configuration, the former is different from the latter in that the configuration of control signal and a function for controlling the control signal is newly implemented. The physical layer 10 in one embodiment of the present invention comprises a Link interface 120, a main logic 100 having a tone generator 101, connection management state machine 102, transmission/reception circuit 103 and an arbitration machine 104, and at least one transmission/reception port 110. The physical layer 10 controls the state of the optical transceiver 30 by the standby signal, the value of which is preset in response to the state transition of the physical layer 10. In other words, when the state machine 102 which manages connection state in the physical layer 10 is in the suspended state, the standby signal is rendered active and is output to the optical transceiver 30.

When the signal detection signal (SD) from the optical transceiver 30 is active (for example, SD is continuously "1", the physical layer 10 is changed from the suspended state into the resume state to make the standby signal inactive which is output to the optical transceiver 30.

Figure 2:
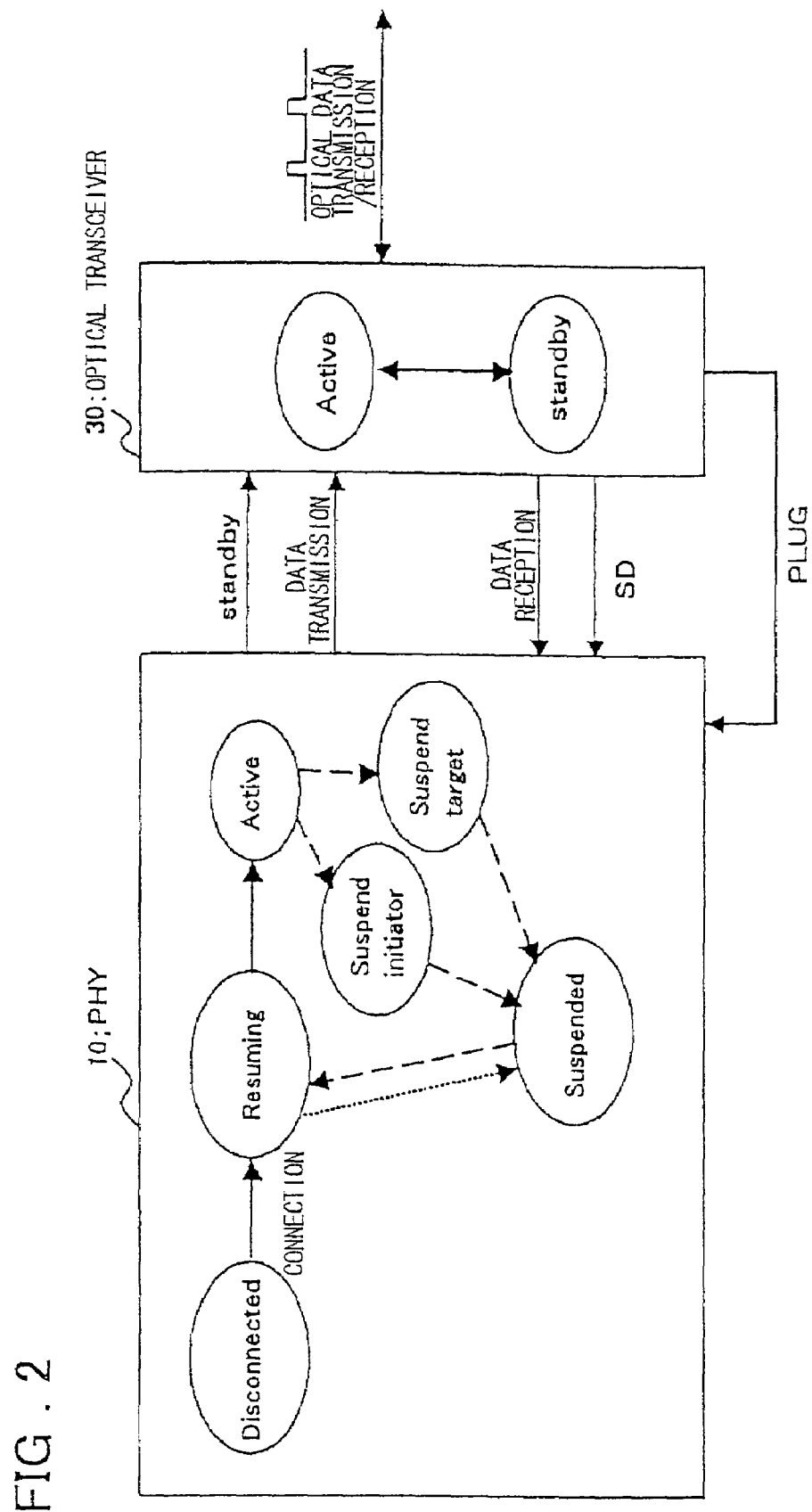
FIG. 2 is a diagram explaining the state transition and signals of the physical layer and transceiver in one embodiment of the present invention.

FIG. 2 is an explanatory view for explaining the state transition and the operation of the state machine 102 in the physical layer 2 in one embodiment of the present invention. Referring to FIG. 2, the state transition of the state machine 102 in one embodiment of the present invention is identical to that in the embodiment which has been described with reference to FIG. 15. However, the physical layer 10 in one embodiment of the present invention makes the standby signal active and outputs the active standby signal in the process of the state transition to the suspended state.

When the physical layer 10 is in the suspended state, that is low power consumption mode, the physical layer 10 makes the standby signal active and notifies the optical transceiver 30. On receipt of the active standby signal, the optical transceiver 30 changes from the active state into the standby state (low power consumption mode). The standby signal generating circuit comprises a comparator circuit to which the state of the state machine 102 is input and makes its output active when the input state matches with the suspended state and a circuit for latching the output of the comparator circuit (both circuits being not shown). The standby signal can be obtained from the output of the latch circuit.

The optical transceiver 30, on receipt of the optical signal from the optical fiber, makes the signal detection signal (SD) active and informs the physical layer 10. The physical layer 10 receives the signal detection signal (SD) to initiate the process to change the state from the suspended state into the resuming state. This assures that the system will be resumed.

Figure 3:
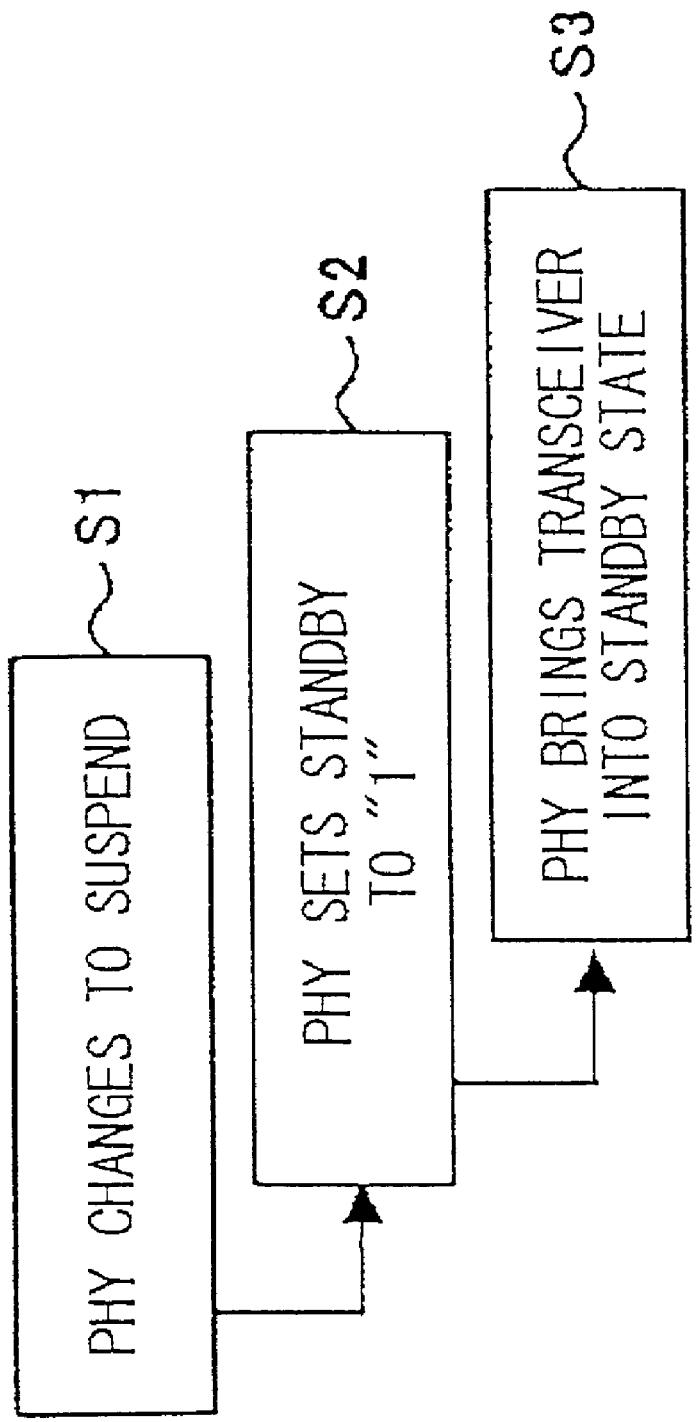
FIG. 3 is a flow chart explaining the operation in one embodiment of the present invention.
Figure 4:
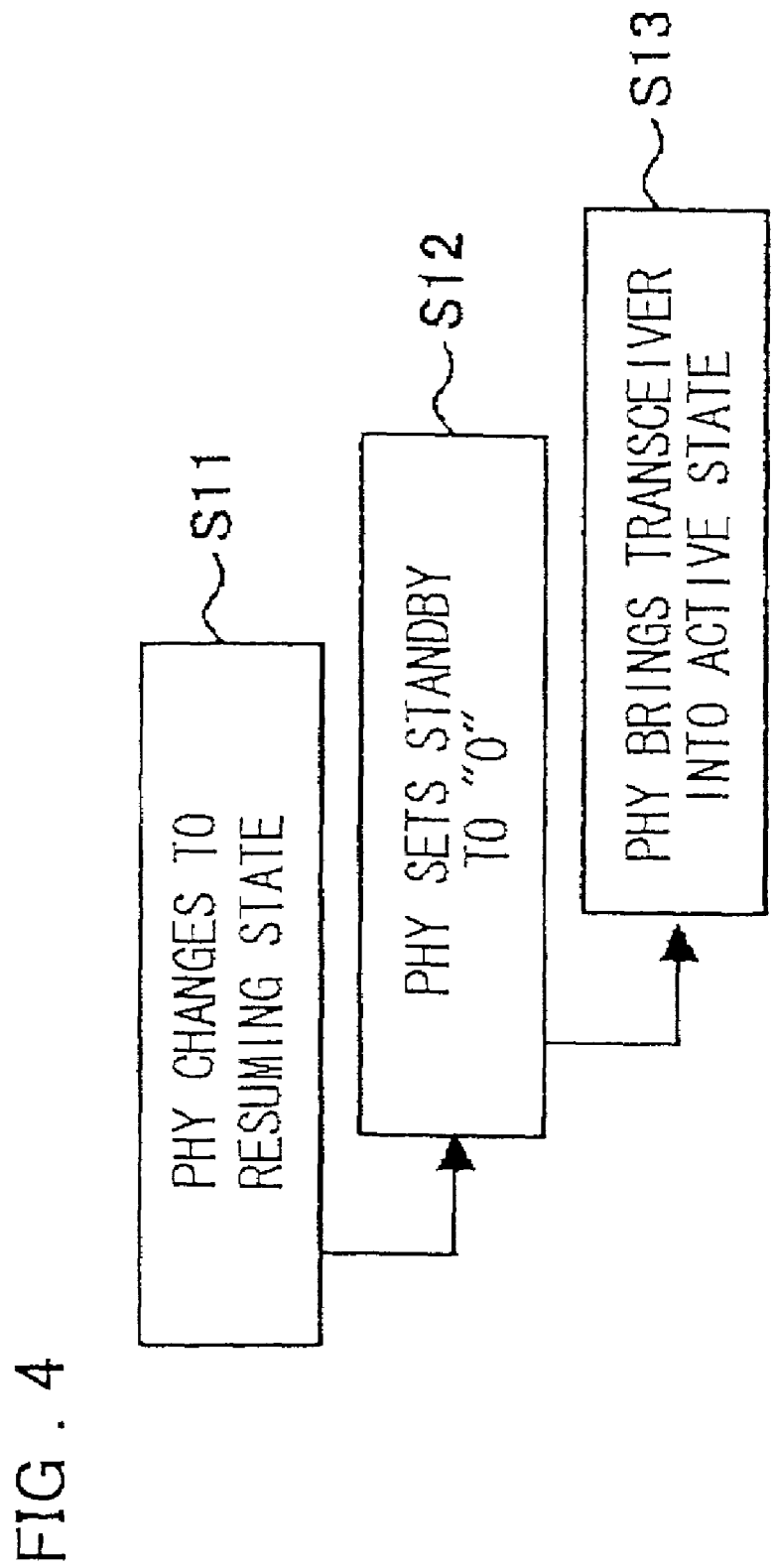
FIG. 4 is a flow chart explaining the operation in one embodiment of the present invention.
Figure 5:
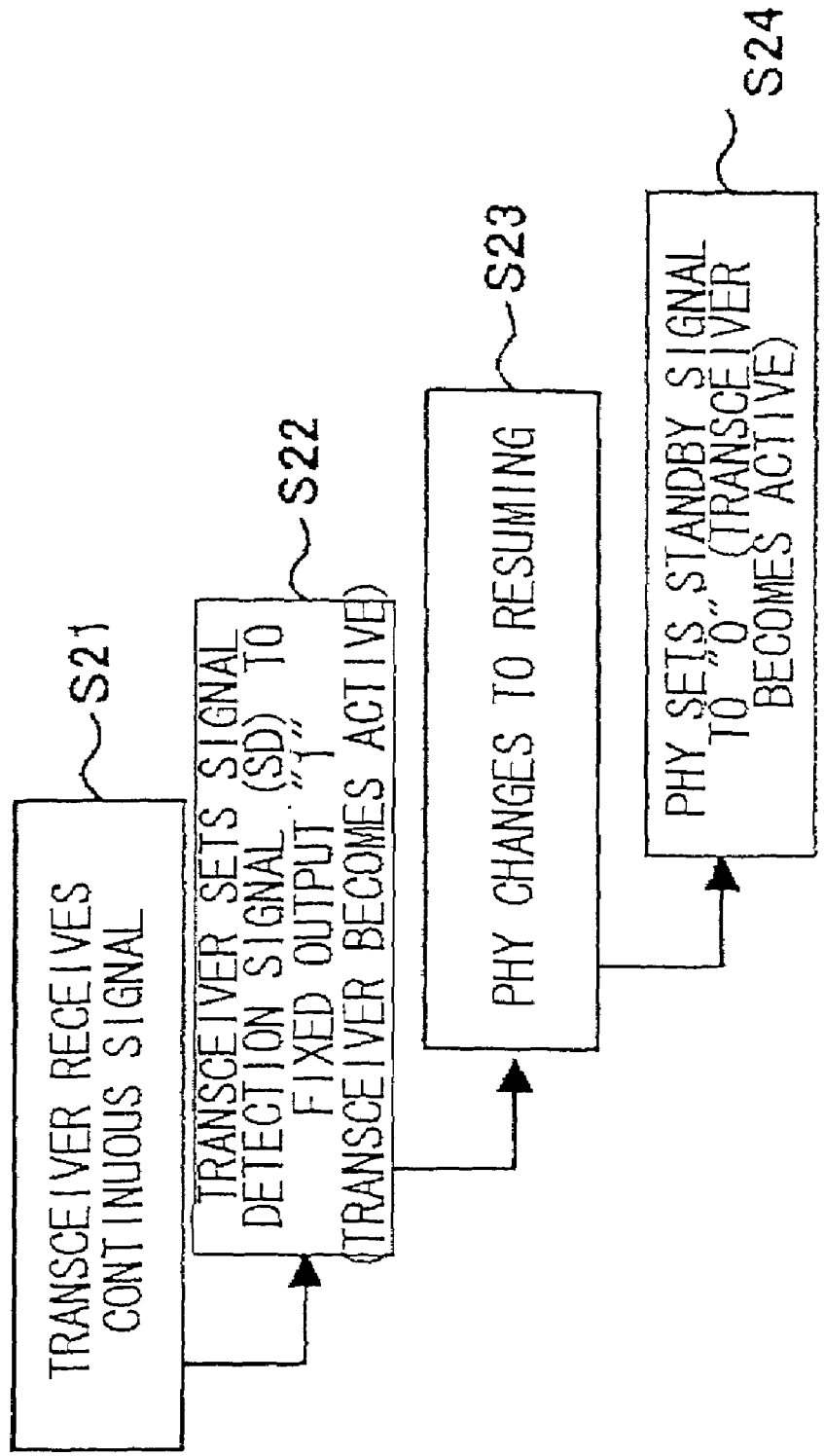
FIG. 5 is a flow chart explaining the operation in one embodiment of the present invention.

FIGS. 3 through 5 are flow charts explaining the operation in one embodiment of the present invention. Referring to FIG. 3, when the physical layer (PHY) 10 of one of the nodes (electronic devices which are connected via IEEE 1394 cable) makes a transition into the suspended state in response to an instruction from its higher level device or other node (step S1), the physical layer 10 sets the standby signal to "1" (in this example, a logic value 1 indicates active) (step S2) and brings the optical transceiver 30 into the standby state (step S3). Even when the optical transceiver 30 is in the standby state, exchanging of the connection management tone signal (TONE) (refer to FIG. 6) with other nodes is conducted at specified time intervals.

Referring to FIG. 4, when the physical layer (PHY) 10 of one of the nodes changes the suspended state to the resuming state in response to an instruction from the higher level device or resetting, etc. (step S11), the physical layer 10 sets the standby signal into "0" (step S12) so that the optical transceiver 30 is brought into an active state in which it is capable of transferring normal data (step S13).

Referring to FIG. 5, when the optical transceiver 30 of one node (self node) receives a continuous signal indicating the resuming state of the physical layer of the opposing node (step S21), the optical transceiver 30 sets the signal detection signal (SD) to "1" (step S22). The physical layer 10 of the one node which receives the signal detection signal (SD) makes a state transition from the suspended state to the resuming state (step S23). The physical layer 10 of the one node sets the standby signal to "0" (step S27). In response to this, the optical transceiver 30 releases the standby state and changes into active state.

The standby signal is transferred from the physical layer 10 to the optical transceiver 30 in response to the state of the physical layer in such a manner that the standby signal is "1", from "1" to "0", and "0" when the state of the transmission/reception port of the physical layer 10 is in the suspended state, resuming state and active state, respectively. The standby signal is not limited to a DC signal, which is fixed at high or low level and may be pulse signal, which is transferred from the physical layer 10 to the optical transceiver 30.

In one embodiment of the present invention, a signal detection signal (SD) is used for transmitting the transition of the state of the opposing node from the standby state to the resuming state so that the conventional signal detection circuit may be used as it is.

When the optical transceiver 30 is set to standby state in the above-mentioned embodiment of the present invention, transmitting and receiving circuits of the optical transceiver 30 are set to the low power consumption state. Low power consumption may be achieved by bringing the optical transceiver 30 into the standby state in which the power supply voltage fed to the circuits is lowered in the low power state, turns off the circuits except when the circuits are in operation (for example, at the time of transmitting a tone signal), or stopping the supply of clocks if there is provided a clock circuit.

Figure 6:
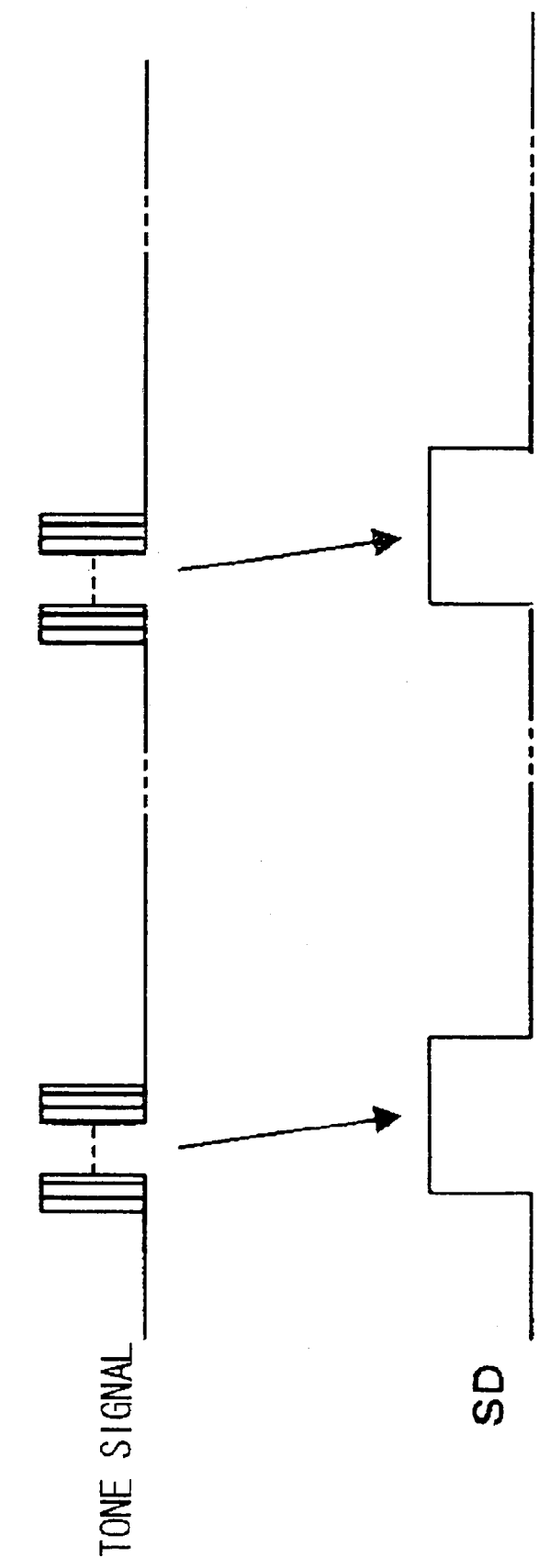
FIG. 6 is a diagram explaining the tone signal and its detection.

Now, another embodiment of the present invention will be described. In the IEEE 1394 specification, communication with other nodes which are connected via the serial bus is performed by using a tone signal sent by specified time intervals (one tone signal comprises a pulse train having a frequency of, for example, 50 MHz) as shown in FIG. 6 even when the physical layer of one of the nodes is in the suspended state. Connection management is performed by the optical transceiver in the opposing node, which has received the tone signal, notifying the physical layer of the opposing node of the signal detection signal (SD). When the physical layer 10 is in the active state, a high speed continuous signal is transmitted at a transfer rate of, for example, 125 Mbps, 250 Mbps, 500 Mbps (Megabits/sec).

Since the tone signal (TONE) is transmitted at constant time intervals, the power is less consumed when the physical layer 10 is suspended state than when the data is transmitted at a transmission rate of 100 Mbps or more in the active state of the physical layer 10. However, since the tone signal comprises high speed pulse trains(for example, 50 MHz), the optical transceiver 30 drives the high speed pulse trains, it consumes the corresponding power if the tone signals are transmitted at specified time intervals.

In a second embodiment of the present invention, the physical layer 10 is in the suspended state, the optical transceiver 30 is brought into the standby state. At this time, the frequency of the pulse signal which constitutes a tone signal (pulse frequency is 50 MHz) which is transmitted at specified time intervals is reduced to 500 KHz which is one hundredth. Power consumption in the optical transceiver 30 can be reduced by reducing the frequency of the tone signal which s used in the suspended state to about one hundredth of the prescribed value (500 KHz in FIG. 7) in order to reduce the power consumption when the optical transceiver 30 is in the standby mode.

In such a manner, reduction in power consumption is achieved in the second embodiment of the present invention by lowering the frequency of the pulse train of the tone signal which is used when the physical layer 10 is in the suspended state less than the prescribed frequency.

In IEEE 1394, if the physical layer of one node is brought into the resuming state from the suspended state (the tone signal is transmitted at specified time intervals), the one node in interest transmits a high speed continuous signal instead of transmitting a tone signal of constant time intervals. Other node which is connected to the one node via a serial cable detects the high speed continuous signal to change the state of the other node from the suspended state to the resuming state. That is, the node notifies the resuming information by a change from the tone signal to the high speed continuous speed. The signal detecting circuit of the optical transceiver of the node which has received the continuous signal outputs the signal detection signal (SD) to the physical layer as a fixed value of "1".

The tone signal is changed to the high speed continuous signal in the resuming process as shown in FIG. 17. Since high speed operation is required for the optical detecting circuit in the optical transceiver 30 in order to detect the high speed continuous signal in the optical detecting circuit, the power consumption increases.

Figure 7:
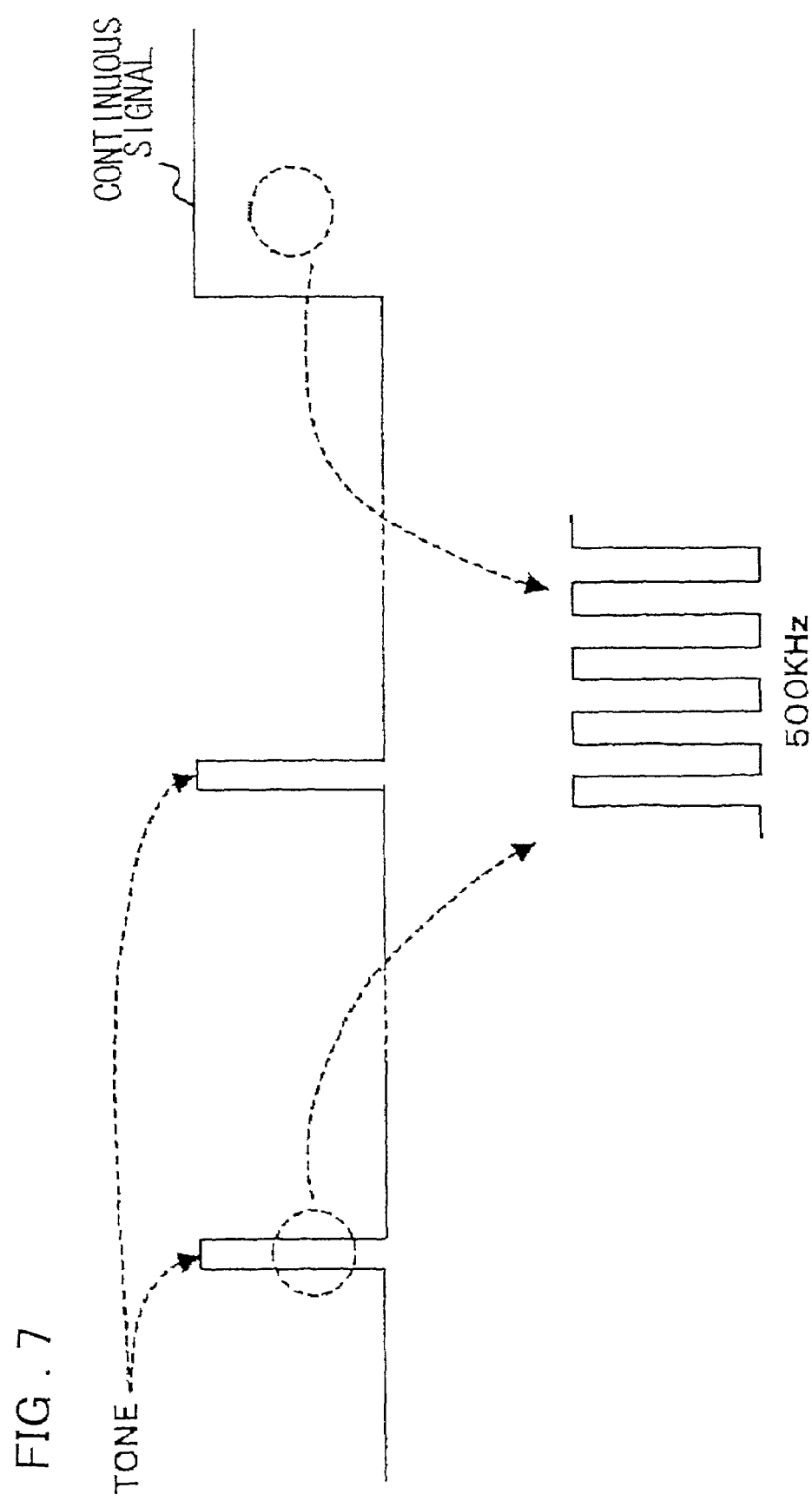
FIG. 7 is a diagram schematically illustrating wave forms of the tone signal and continuous signal in one embodiment of the present invention.

Therefore, in a modification of the second embodiment of the present invention, the opposing communication node may output a low speed continuous signal (for example, the pulse train has a frequency of 500 KHz; refer to FIG. 7) instead of high speed continuous signal for an initial predetermined interval at which the tone signal is switched to continuous signal (which is set in accordance with the specification of IEEE 1394).

Figure 8:
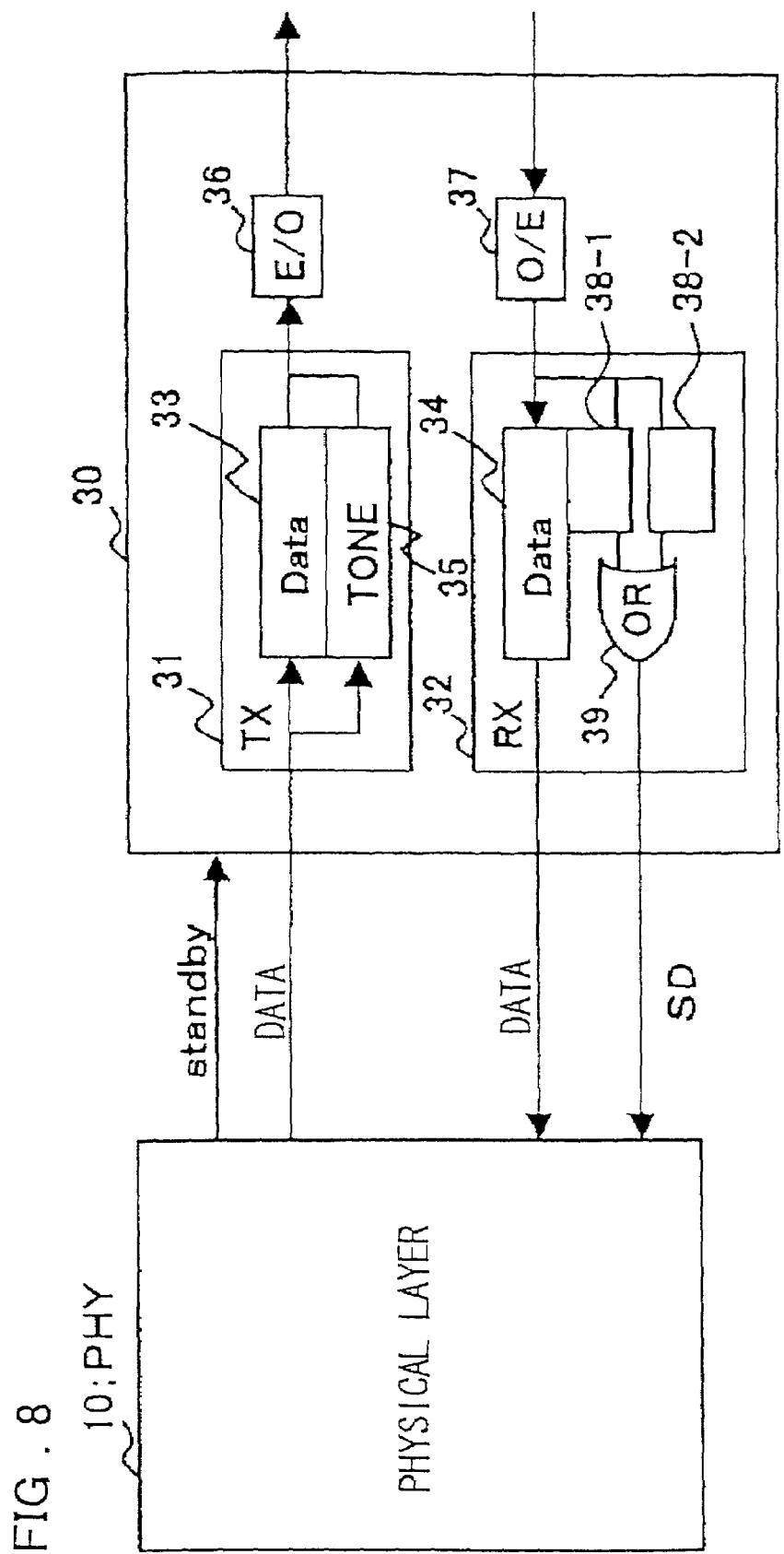
FIG. 8 is a diagram showing the configuration of the optical transceiver in one embodiment of the present invention.

FIG. 8 is a diagram showing an exemplary configuration of the optical transceiver 30 in the second embodiment of the present invention. Referring to FIG. 8, the transmit circuit 31 of the optical transceiver 30 is provided with a tone output circuit 35 for transmitting a low speed tone signal (pulse frequency is 500 KHz) in addition to a transmission circuit 33 for transmitting data at a transmission rate of 100, 200, and 500 Mbps.

When the standby signal from the physical layer 10 becomes active, the data transmission circuit 33 of the optical transceiver 30 is brought into inactive state (for example, power supply is turned off), a low speed tone output circuit 35 is selected, fed with a supply power and its output is connected to an E/O conversion circuit 36. On the other hand, when the standby signal from the physical layer 10 is inactive, the low speed tone signal output circuit 35 is brought into the inactive state and the data transmission circuit 33 is brought into active state.

The receive circuit 32 of the optical transceiver 30 comprises a data receive circuit 34 and a high speed signal detection circuit 38-1 and a low speed signal detection circuit 38-2. When the standby signal from the physical layer 10 becomes active, the high speed signal detection circuit 38-1 is brought into the inactive state while the low speed signal detection circuit 38-2 is brought into the active state so that the signal which is detected by the low speed signal detection circuit 38-2 is transmitted to the physical layer 10 via an OR circuit 39 as the signal detection signal (SD).

In the second embodiment of the present invention, a low power consumption node is achieved by the optical transceiver 30 bringing the high speed circuit block which consumes much power into the inactive state and bringing the tone signal transmission circuit or the signal detection circuit into the active state when the standby signal from the physical layer 10 is active.

Further reduction in consumed current can be achieved since the signal detection circuit does not have to follow the high speed signal due to the fact that the initial part of the continuous signal is replaced with the low speed continuous signal for a predetermined interval (that is since only the low speed signal detection circuit 38-2 can be brought into the active and the high speed detection circuit 38-1 can be brought into the inactive state in FIG. 8).

Now, a third embodiment of the present invention will be described. The tone signal is used for detecting the connection. The physical layer determines that the connection is disconnected when the tone signal is not received. However, some device may be used while it is normally connected in some applications without insertion or removal of the IEEE1394 serial bus.

In the third embodiment of the present invention, the transmission and reception of the tone signal for monitoring the connection is omitted in such an application to reduce the power consumption in the standby state. For example, no tone signal is transmitted or received when the physical layer 10 is in the suspended state provided that the optical cable connector is fixed in the normally connecting state to the optical transceiver and the optical cable is not inserted or removed like a home network in which home electric appliances are mutually connected by an IEEE 1394 bus in a home or a vehicle mounted network.

In the third embodiment of the present invention, the physical layer 10 does not take the disconnected state in a state transition diagram shown in FIG. 2, and does not transmit any tone signal when it is in the suspended state.

Since the plug signal (PLUG) is active "1" at all times when the connector of the optical transceiver 30 is connected with the optical cable connector in two nodes which are connected to each other via an optical cable, the physical layer 10 does not make a transition to the disconnected state under this condition. When the optical cable is removed from the connector and the plug signal (PLUG) becomes inactive "0", the state machine 102 of the physical layer 10 causes a transition to the disconnected state.

Since the tone generating circuit 101 (refer to FIG. 13) of the physical layer 10 and the tone output circuit (designated by a reference number 35 in FIG. 8) in the optical transceiver 30 do not transmit any tone signal in the third embodiment of the present invention, they are in the inactive state so that reduction in power consumption can be achieved. The circuit, which received the tone signal transmitted from the connecting opposing node, is brought into the active state in the physical layer in the third embodiment of the present invention.

In a modification of the third embodiment of the present invention, a tone signal for an initialization purpose is not transmitted, but a continuous signal may be transmitted from the beginning as a resuming signal when the physical layer 10 is changed from the suspended state to the resuming state.

If it is configured that the continuous signal is transmitted from the beginning as resuming signal when transmission and reception of the tone signal is terminated and the physical layer 10 is changed from the standby state to the resuming state, the tone generating circuit 101 (refer to FIG. 13) of the physical layer and the tone output circuit (represented at 35 in FIG. 8) in the optical transceiver 30 may be omitted. If it is configured that no tone signal is transmitted, the transmit circuit 31 of the optical transceiver 30 comprises only data transmission circuit 33 in FIG. 8. When the optical transceiver 30 is in the standby state, the transmission circuit 33 of the optical transceiver 30 and the data receive circuit 34 are required to be in the inactive state and the signal detection circuit 38 and the O/E conversion circuit 37 are required to be in the active state (ON state).

If the pulse train of the continuous signal which is the resuming signal when the physical layer 10 is resumed from the suspended state has a low frequency for a predetermined period of time, only the low speed signal detection circuit 38-2 of the signal detecting circuits 38 is required to turn on in the optical transceiver 30 when the optical transceiver 30 is in the standby state.

The optical transceiver 30 which has received the continuous signal from the opposing node brings the signal detection signal (SD) into "1" and outputs it to the physical layer 10. The physical layer 10 is changed to the resuming state.

Figure 9:
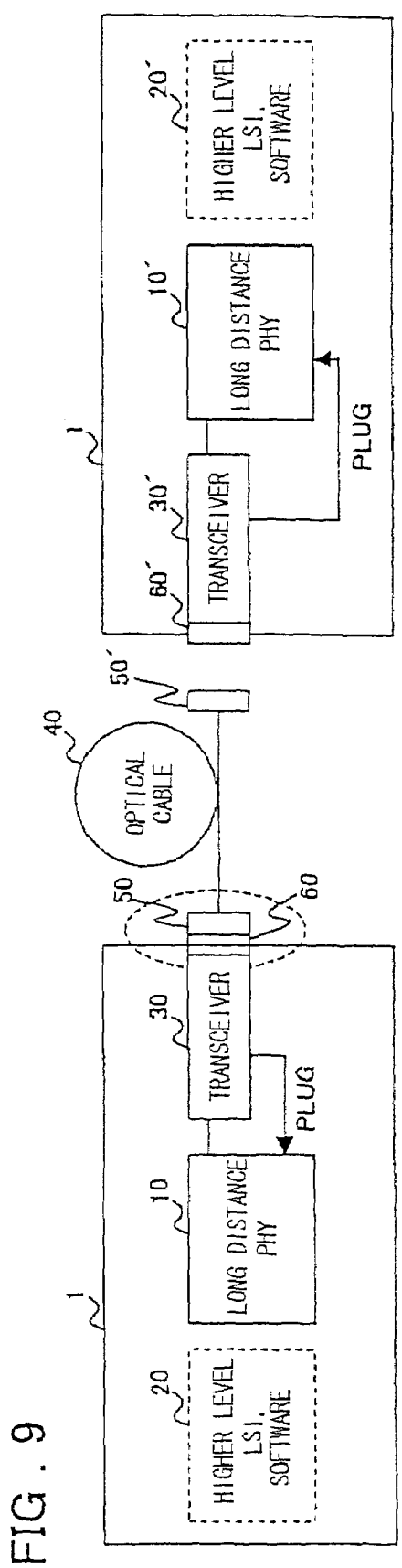
FIG. 9 is a diagram explaining another embodiment of the present invention.
Figure 10:
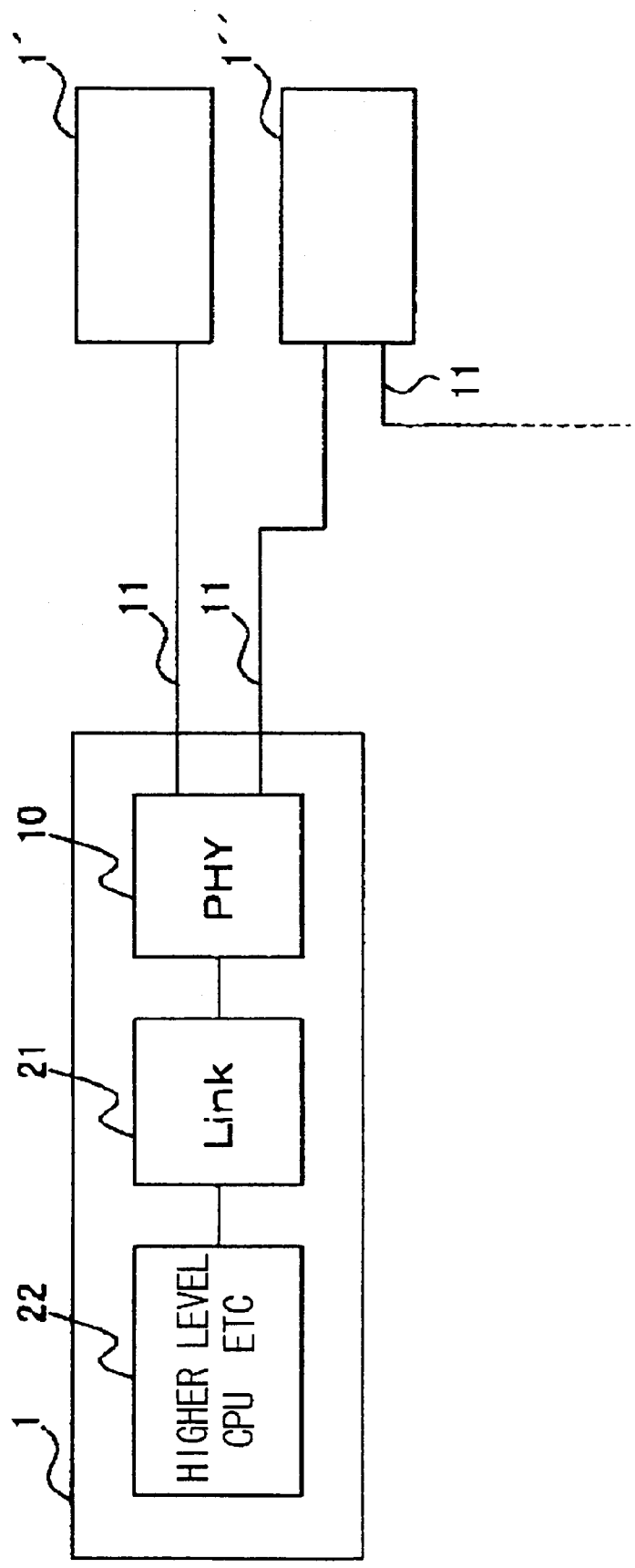
FIG. 10 is a diagram schematically showing the configuration of the IEEE 1394 device.
Figure 11:
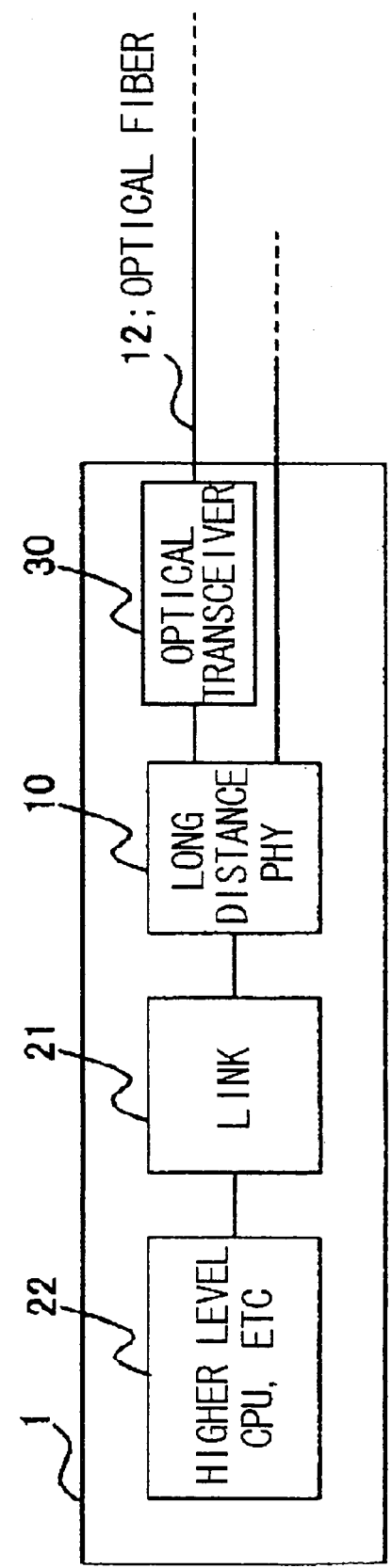
FIG. 11 is a diagram schematically showing the configuration of the IEEE 1394 long distance device.

Now, a fourth embodiment of the present invention will be described. FIG. 9 is a diagram showing the configuration of the fourth embodiment of the present invention. If the connector 50 of the optical cable 40 is connected to the connector 60 of the optical transceiver 30 in the IEEE 1394 long distance device of one of the nodes, the optical transceiver 30 sets the plug signal (PLUG) to "1" and outputs it to the physical layer 10.

The physical layer 10 receives the plug signal (PLUG) which is set to "1" to trigger the tone generating unit 101 (refer to FIG. 13) so that the unit outputs a tone signal for a predetermined period of time (which is enough to recognize and initialize the bus).

If the physical layer 10 of the node 1 which has outut the tone signal does not receive any tone signal as a response from the opposing node 1' (it does not receive any tone signal within a period of time which is determined by the monitoring timer, etc.), the physical layer 10 remains in the disconnected state to terminate the transmission of the tone signal.

The optical transceiver 30 makes the standby signal active to initiate the standby operation in response to the disconnected state of the physical layer 2. The state in which the physical layer 10 terminates the output of the tone signal and the optical transceiver 30 initiates the standby operation in response thereto is referred to as second disconnected state (Disconnected2).

The sequence will be described in which the connector 50 of the optical cable 40 is connected to the connector 60 (plug) of the optical transceiver 30 in the node 1 and the connector 50' of the optical cable 40 is connected to the connector (plug) 60' of the optical transceiver 30' in the node 1' as shown in FIG. 9.

If the connector 50 of the optical cable 40 is not connected to the connector 60 (plug or receptacle) of the optical transceiver 30, the plug signal (PLUG) is rendered "0". The physical layer 10 receives the plug signal (PLUG) and the state of the physical layer 10 is in the disconnected state, so that the physical layer 10 terminates output of the tone signal and the optical transceiver 30 is in the standby state.

When the connector 50 of the optical cable 40 is connected to the connector 60 (plug or receptacle) of the optical transceiver 30, the physical layer 10 of the node 1 receives the plug signal (PLUG) which is changed from "0" to "1" to output a tone signal for a predetermined period of time.

Since the optical cable 40 is not connected to the transceiver in the opposing node 1' in this case, the node 1 does not receive any tone signal, which is a response signal from the opposing node 1'. Accordingly, the physical layer 10 of the node 1 terminates the transmission of the tone signal and the optical transceiver 30 is brought into the standby state and returns to disconnected state (Disconnected2).

After that, when in the opposing node 1', the connector 50' of the optical cable 40 is connected to the connector 60' (plug or receptacle) of the transceiver 30' in the opposing node 1', the physical layer 10 receives the plug signal (PLUG) and outputs a tone signal.

If the node 1 receives a tone signal which is a response from the opposing node 1', the physical layer 10 of the node 1 makes a transition from the above-mentioned second disconnected state (Disconnected2) to the disconnected state (Disconnected) to transmit a tone signal to the device to be connected. The tone signal, which is transmitted or received, may have a low pulse frequency as mentioned in the second embodiment.

After completion of initialization with the tone signal (after the completion of speed arbitration), the physical layer 10 of the node 1 transmits a continuous signal as the initialization and changes to a resuming process in which given subsequent handshake is performed and thereafter changes to the active state (Active).

The third embodiment is configured in such a manner that the transmission of the tone signal is terminated when the physical layer is suspended, that is the optical transceiver is in the standby state under a condition that no cable is inserted or removed from between two nodes. The fourth embodiment of the present invention is configured in such a manner that the tone signal is output for a predetermined period of time when the plug signal (PLUG) which is a connector connection signal becomes active and that the transmission of the tone signal is terminated if the tone signal which is a response from the opposing node is not received. Combination of the third and fourth embodiments enables the optical cable to be inserted and removed even if it is configured so that the transmission of the tone signal is terminated when the optical transceiver is in the standby state.

Referring to FIG. 9, there is shown a modification of the fourth embodiment of the present invention. When the plug signal (PLUG) which is output from the optical transceiver 30 is changed from "0" (active) to "1" (inactive) in the one of nodes 1 which is connected the other optical cable 40, the physical layer 10 correspondingly changes from the disconnected state to the resuming state. A continuous signal is transmitted from the node 1 to the opposing node 1', followed by a predetermined handshake. If the opposing node 1' is not connected to a bus (cable) at this time, the physical layer 10 of the node 1 changes from the resuming state to the suspended state a predetermined period of time after the transmission of the continuous signal (at timeout of a transmission monitoring timer) and waits the transmission of the continuous signal from the opposing node (signal detection signal SD="1"). The physical layer 10 of the node 1 makes a transition to the resuming state when it receives the continuous signal from the opposing node.

The circuits except the O/E, E/O conversion circuits comprising photodiodes and semiconductor laser in the optical transceiver may be incorporated in the physical layer and the optical transceiver may be formed of the O/E, E/O conversion circuits.

With regards to the physical layer and the transceiver as well as the Link layer LSI which is the higher level layer of the physical layer in accordance with the present invention, initiation of the suspended state of the physical layer may be controlled based upon the presence or absence of the connection of the Link layer LSI of the node which is connected to the bus. As an example, the suspended state of the physical layer may be initiated if there is no Link layer LSI in both electronic devices of two nodes, which are connected to each other via the IEEE 1394 serial bus. The physical layer may not be suspended if there is a Link layer LSI in any one of the electronic devices of two nodes.

In one of two nodes which are connected to each other via the IEEE 1394 serial bus, if the optical transceiver is connected to the transmission/reception port of the physical layer, the Link layer LSI is connected to the physical layer, an electric port is provided as the transmission/reception port and a device which is connected to the electric port is turned on, and the optical transceiver is connected to the physical layer of the other node which is connected to said one node through the optical cable with no Link layer LSI existing, and if an electric port is not connected or a device which is connected to the electric port is turned off (due to the fact that said one node is communicated with other node via the optical transceiver), the transmission/reception port which is connected to the optical transceiver of the physical layer of said one node may be suspended and the port which is connected to the optical transceiver in the physical layer of the other node may be suspended. In this case, the optical transceiver, which is connected to the suspended port, is brought into the standby state.

Although the present invention has been described with reference to the embodiments in which reduction in power consumption of the optical transceiver which is connected to the optical port of the physical layer of the long distance device of the IEEE 1394 standard, the present invention may be applied to a transceiver (driver circuit and receiver circuit) of the electric port in the long distance device of the IEEE 1394 standard (using cat-5 UTP; category 5 Unshielded Twisted Pair which has been described as a cable).

As mentioned above, The meritorious effects of the present invention are summarized as follows.

One of meritorious effects of the present invention resides in that the power consumption of the whole of the device can be reduced by bringing the transceiver into low power consumption mode when the physical layer is in the low power consumption mode.

Another meritorious effect of the present invention resides in that reduction in power consumption of the transceiver can be achieved by making the frequency of the pulses of the connection-monitoring signal lower than the predetermined value.

Another meritorious effect of the present invention resides in that due to the fact that connection monitoring tone signal is not used in the low power consumption mode and the operation of the transmission circuit and receive circuit can be terminated in the transceiver unit and it is necessary to operate only a circuit for detecting a tone signal from the opposing mode, so that further low power consumption mode can be achieved.

Another meritorious effect of the present invention resides in that it is not necessary to operate at a high speed the signal detection circuit for detecting a continuous signal, the reason of which is that in the present invention, the initial part of the continuous signal which forms a resuming signal is replaced with a low speed continuous signal at a predetermined interval, so that power consumption can be reduced.

Another meritorious effect of the present invention resides in that it is configured in such a manner the that transmission of tone signal from one node is terminated if tone signal which is a response from opposing node is not received by the one node at the time of connection of a cable connector to a transceiver connector, so that power consumption can be reduced.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. An electronic device comprising at least a transceiver and a physical layer which transmits and receives data to and from said transceiver, said electronic device communicating with another electronic device via a bus to which said transceiver is connected, wherein said physical layer comprises means to control a mode of operation of said transceiver based upon a state of operation of said physical layer, said physical layer comprises:
   one or more transmission/reception ports;
   a state machine circuit which controls transition of state for each port, said state being among a disconnected state, a suspended state which is the interrupted state, a resuming state which is a resuming process from said disconnected state or said suspended state to an active state and an active state; and
   means which makes active a standby signal to output said standby signal, said standby signal being a control signal to instruct said transceiver connected to said transmission port to change into the lower power consumption mode, when a state of said transmission/reception port, state transition of said transmission/reception port being managed by said state machine circuit of said physical layer, is in the disconnected state, or when said transmission/reception port is changed into the suspended state in response to an instruction issued from another electronic device which is connected via said bus to said electronic device or from a higher level device of said electronic device.

2. The electronic device as defined in claim 1, wherein when said physical layer is in the resuming state, said physical layer makes inactive said standby signal; and
   wherein said transceiver is configured to change from the standby state which brings said low power consumption to the active state when said transceiver receives said inactive standby signal output from said physical layer.

3. An electronic device comprising at least a transceiver and a physical layer which transmits and receives data to and from said transceiver, said electronic device communicating with another electronic device via a bus to which said transceiver is connected, wherein said physical layer comprises means to control a mode of operation of said transceiver based upon a state of operation of said physical layer, said electronic device further comprises means which transmits a low speed tone signal having pulse components, the frequency of said pulse components being lower than a predetermined value as a tone signal which is transmitted for monitoring connection between said electronic device and another device which is connected thereto through a bus when said physical layer is in a low power consumption mode.

4. The electronic device as defined in claim 3, wherein said transceiver of said electronic device comprises a low speed signal detecting circuit which detects said low speed tone signal having pulse components, a frequency of said pulse components is lower than a specified value.

5. The electronic device as defined in claim 4, wherein said transceiver comprises an output circuit for outputting a low speed signal having a pulse frequency lower than a specified value and a low speed signal detecting circuit as a circuit for transmitting and receiving a tone signal which is transmitted and received for monitoring the connection; and
   wherein said transceiver activates an output path for outputting the low speed signal and a detecting path for detecting the low speed signal and inactivates remaining circuits of said transceiver.

6. An electronic device comprising at least a transceiver and a physical layer which transmits and receives data to and from said transceiver, said electronic device communicating with another electronic device via a bus to which said transceiver is connected, wherein said physical layer comprises means to control a mode of operation of said transceiver based upon a state of operation of said physical layer, wherein said physical layer of said electronic device transmits a resuming signal to said bus when said physical layer changes to a resuming state which is a resuming process from a low power consumption mode,
   said transceiver of said electronic device which has received said resuming signal which is transmitted to said bus from another electronic device connected to said bus notifies the physical layer of said electronic device of the detection of said resuming signal when said transceiver detects said resuming signal at its signal detecting circuit,
   said physical layer of said electronic device changes to the resuming state which is a resuming process from said low power consumption mode in response to said notification of said signal detection and makes inactive the standby signal which is a control signal to instruct said transceiver of said electronic device to change into the low power consumption mode and outputs the standby signal; and
   said transceiver of said electronic device changes to an active state from an standby state which is the low power consumption mode on receipt of said inactive standby signal by said transceiver, wherein in said resuming state which is the resuming process from the low power consumption mode, said electronic device outputs a continuous signal as said resuming signal to said bus for the another electronic device connected to said electronic device via the bus without transmitting a tone signal for initialization.

7. An electronic device comprising at least a transceiver and a physical layer which transmits and receives data to and from said transceiver, said electronic device communicating with another electronic device via a bus to which said transceiver is connected, wherein said physical layer comprises means which brings said transceiver from normal operation mode into low power consumption mode when said physical layer is in the low power consumption mode, wherein said physical layer of said electronic device transmits a resuming signal to said bus when said physical layer changes to a resuming state which is a resuming process from a low power consumption mode, said transceiver of said electronic device which has received said resuming signal which is transmitted to said bus from another electronic device connected to said bus notifies the physical layer of said electronic device of the detection of said resuming signal when said transceiver detects said resuming signal at its signal detecting circuit,
   said physical layer of said electronic device changes to the resuming state which is a resuming process from said low power consumption mode in response to said notification of said signal detection and makes inactive the standby signal which is a control signal to instruct said transceiver of said electronic device to change into the low power consumption mode and outputs the standby signal; and said transceiver of said electronic device changes to an active state from an standby state which is the low power consumption mode on receipt of said inactive standby signal by said transceiver, wherein said electronic device comprises means which transmits a low speed continuous signal having a speed lower than a specified value for a predetermined period of time from the beginning of said continuous signal when said electronic device transmits to said bus the continuous signal forming said resuming signal for the another electronic device connected to said electronic device via the bus.

8. The electronic device as defined in claim 7, wherein said electronic device comprises a signal detecting circuit which is configured to detect said low speed continuous signal which is transmitted on said bus; and wherein said signal detecting circuit notifies said physical layer of signal detection when said signal detecting circuit detects reception of said low speed continuous signal.

9. The electronic device as defined in claim 7, wherein said transceiver comprises a low speed signal detecting circuit, and wherein when said transceiver is in the low power consumption mode, said transceiver activates said low speed signal detecting path and inactivates other transmitting and receiving circuits which constitute said transceiver.

10. An electronic device comprising at least a transceiver and a physical layer which transmits and receives data to and from said transceiver, said electronic device communicating with another electronic device via a bus to which said transceiver is connected, wherein said physical layer comprises means to control a mode of operation of said transceiver based upon a state of operation of said physical layer, said physical layer of said electronic device terminates transmission of tone signal for monitoring bus connection to another electronic device connected to said electronic device via the bus when said physical layer of said electronic device is in a low power consumption mode.

11. The electronic device as defined in claim 10, wherein said electronic device and said another electronic device are constantly connected via said bus in use thereof.

12. An electronic device comprising at least a transceiver and a physical layer which transmits and receives data to and from said transceiver, said electronic device communicating with another electronic device via a bus to which said transceiver is connected, wherein said physical layer comprises means to control a mode of operation of said transceiver based upon a state of operation of said physical layer, wherein a bus cable is removably inserted into a bus connecting connector of the transceiver of said electronic device, said transceiver being adapted to make a connector connection signal active to output said connector connection signal to said physical layer when said bus cable is connected to said connector;

wherein said physical layer is adapted to transmit a connection monitoring tone signal via said transceiver to said bus on receipt of said connector connection signal which has changed from an inactive state to an active state when said bus cable is connected to said bus connecting connector of said transceiver of said electronic device; and wherein said electronic device comprises means which controls said electronic device to terminate transmission of the connection monitoring tone signal if a response signal to said connection monitoring tone signal which has been transmitted to said bus is not received, said transceiver of said electronic device being set to the standby state which is a low power consumption mode.

13. The electronic device as defined in claim 12, wherein said physical layer of said electronic device which transmits the connection monitoring tone signal to said bus via said transceiver when said bus cable is connected to said connector of said transceiver of said electronic device is adapted to transmit the connection monitoring tone signal to another electronic device connected via said bus from said transceiver of said electronic device at predetermined time intervals if said physical layer receives the response signal to the connection monitoring tone signal which is transmitted to said bus.

14. The electronic device as defined in claim 12, wherein said transceiver comprises an optical transceiver and said bus cable comprises an optical fiber cable.

15. An electronic device comprising at least a transceiver and a physical layer which transmits and receives data to and from said transceiver, said electronic device communication with another electronic device via a bus to which said transceiver is connected, wherein said physical layer comprises means to control a mode of operation of said transceiver based upon a state of operation of said physical layer, wherein a bus cable is removably inserted into a bus connecting connector of the transceiver of said electronic device, said transceiver being adapted to make a connector connection signal active for outputting said connector connection signal to said physical layer when said bus cable is connected to said connector;

said physical layer of said electronic device which has received a transition of said connector connection signal from inactive to active state output from said transceiver when said bus cable is connected to said bus connecting connector of said transceiver in said electronic device is adapted to change to a resuming state which is a resuming process from a unconnected state and to transmit a continuous signal which forms a resuming signal to said bus via said transceiver; and if there is no other electronic device which is to be connected to said electronic device via said bus, said physical layer of said electronic device changes to a suspended state which is a low power consumption mode and waits for the reception of the continuous signal which is transmitted on said bus from another electronic device to which said electronic device is connected.

16. A method for controlling power of an electronic device, wherein said electronic device comprises at least a transceiver and a physical layer for performing the transmission/reception of data to/from said transceiver and said electronic device performing communication with another electronic device via a bus to which said transceiver is connected, said method comprising the steps of:

bringing said transceiver into a low power consumption mode in response to a transition of said physical layer to the low power consumption mode, wherein said physical layer includes one or more transmission/reception ports, said transceiver being connected to one of said transmission/reception ports, a state machine circuit which manages the connection state in said physical layer is adapted to control the state transitions for each of transmission/reception port among a disconnected state which is the disconnected state, a suspended state which is the interrupted state, a resuming state which is a resuming process from said disconnected state or said suspended state to an active state and an active state; and a standby signal which is a control signal to instruct said transceiver connected to said transmission port to change into the lower power consumption mode is made active and is output, when said transmission/reception port, state transition of which is managed by said state machine circuit of said physical layer, is in a disconnected state, or when said transmission/reception port is changed into a suspended state in response to an instruction issued by a higher level device of said electronic device or another electronic device being connected to said transceiver of said electronic device via said bus.

17. A method for controlling power of an electronic device, wherein said electronic device comprises at least a transceiver and a physical layer for performing the transmission/reception of data to/from said transceiver and said electronic device performing communication with another electronic device via a bus to which said transceiver is connected, said method comprising the steps of:

bringing said transceiver into a low power consumption mode in response to a transition of said physical layer to the low power consumption mode, wherein a low speed tone signal having pulse components, the frequency of said pulse components being lower than a specified value is transmitted as a tone signal for monitoring connection between said electronic device and another device which is connected thereto through said bus when said physical layer in said one electronic devices is in the low power consumption mode.

18. A method for controlling power of an electronic device, wherein said electronic device comprises at least a transceiver and a physical layer for performing the transmission/reception of data to/from said transceiver and said electronic device performing communication with another electronic device via a bus to which said transceiver is connected, said method comprising the steps of:

bringing said transceiver into a low power consumption mode in response to a transition of said physical layer to the low power consumption mode, wherein a continuous signal having a rate lower than a specified value, for a predetermined period of time from the beginning of said continuous signal when the continuous signal which forms a resuming signal is transmitted to another electronic device connected to said one of the electronic devices when the physical layer of one electronic device is in a resuming state which is in the resuming process from the suspended state which brings the low power consumption mode; and wherein said transceiver of said another electronic device notifies said physical layer of said another electronic device of the signal detection when said transceiver of said another electronic device detects the reception of said low speed continuous signal at the signal detecting circuit which detects said low speed continuous signal.

19. The method as defined in claim 18, wherein said one electronic device transmits a continuous signal as a resuming signal from the beginning without transmitting any tone signal for initialization when said one electronic device transmits a resuming signal to said another electronic device connected to said one electronic device via said bus in the resuming state which is the resuming process from said low power consumption mode in the physical layer of said one electronic device.

20. A method for controlling power of an electronic device, wherein said electronic device comprises at least a transceiver and a physical layer for performing the transmission/reception of data to/from said transceiver and said electronic device performing communication with another electronic device via a bus to which said transceiver is connected, said method comprising the steps of:

bringing said transceiver into a low power consumption mode in response to a transition of said physical layer to the low power consumption mode, wherein a bus cable is removably inserted into a bus connecting connector of the transceiver of said electronic device, the method comprising the steps of:

said transceiver making a connector connection signal active to output said connector connection signal to said physical layer when said bus cable is connected to said connector;

said physical layer transmitting a connection monitoring tone signal via said transceiver to said bus in response to a transition of said connector connection signal from an inactive state to an active state when said bus cable is connected to said bus connecting connector of said transceiver in said one of electronic devices; and if a response signal to said connection monitoring tone signal which has been transmitted to said bus is not received in one electronic device, transmission of the connection monitoring tone signal being terminated and said transceiver of said one of the electronic devices being set to the standby state which is the low power consumption mode.

21. The method as defined in claim 20, wherein the physical layer of said one of the electronic devices transmits a connection monitoring tone signal at predetermined time intervals to said other electronic device connected to said one of the electronic devices via the bus if the connection monitoring tone signal is transmitted via said transceiver to said bus cable which is connected to the bus connecting connector of the transceiver of said one of the electronic devices and a response signal to said connection monitoring tone signal transmitted to said bus cable.

22. A method for controlling power of an electronic device, wherein said electronic device comprises at least a transceiver and a physical layer for performing the transmission/reception of data to/from said transceiver and said electronic device performing communication with another electronic device via a bus to which said transceiver is connected, said method comprising the steps of:

bringing said transceiver into a low cower consumption mode in response to a transition of said physical layer to the low power consumption mode, wherein a bus cable is removably inserted into a bus connecting connector of the transceiver of said electronic device, said transceiver being adapted to make a connector connection signal active for outputting said connector connection signal to said physical layer when said bus cable is connected to said connector;

said physical layer of said electronic device, in response to a transition of said connector connection signal from an inactive state to an active state, said connector connection signal being output from said transceiver when said bus cable is connected to said bus connecting connector of said transceiver in said electronic device, changes to a resuming state which is the resuming process from an unconnected state and transmits a continuous signal which forms a resuming signal to said bus via said transceiver; and if there is no other electronic device which is to be connected to said electronic device via said bus, said physical layer of said electronic device changes to the suspended state which is the low power consumption mode and waits for the reception of the continuous signal which is transmitted on said bus from the other electronic device to which said electronic device is connected.

* * * * *